Patented Dec. 15, 1953

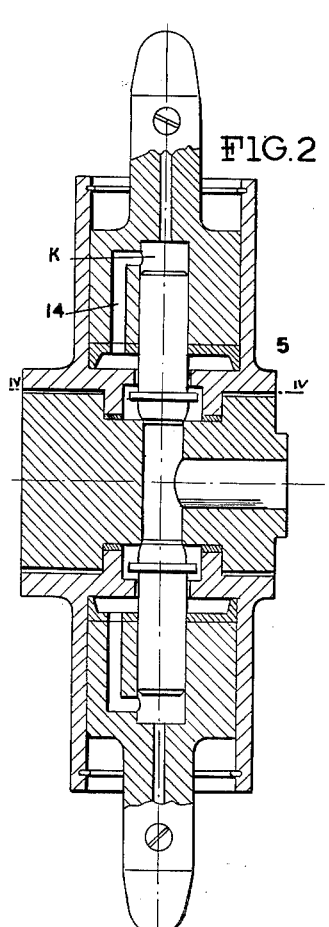
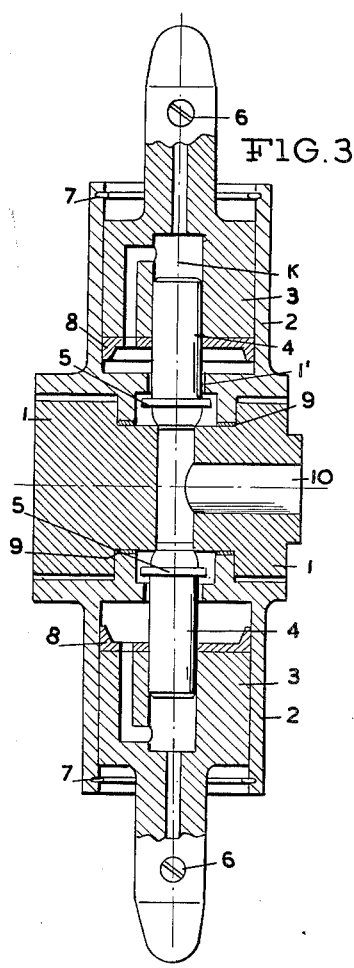
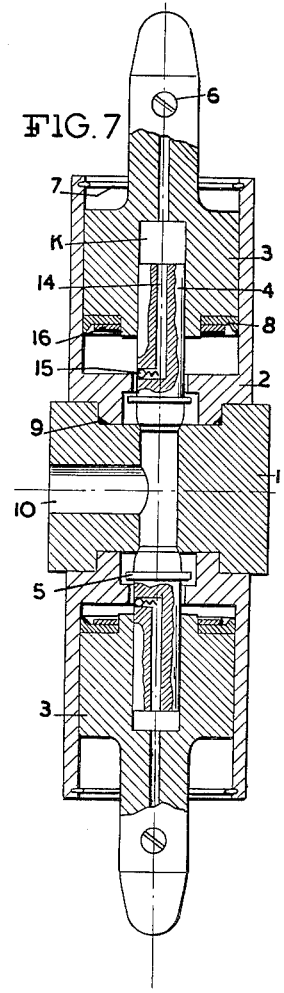
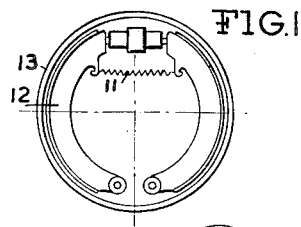
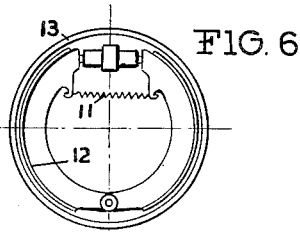
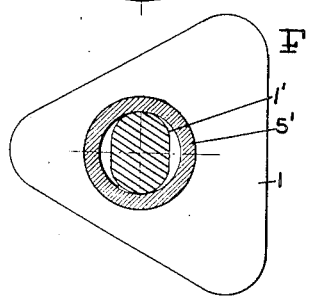
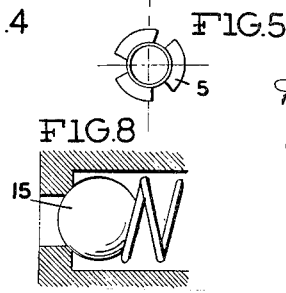
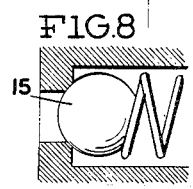

2,662,617

UNITED STATES PATENT OFFICE 2,662,617

SELF-ADJUSTING WHEEL BRAKE

Robert Adolphe Paul Mougin, Paris, France

Application October 27, 1950, Serial No. 192,549

Claims priority, application France
November 5, 1949

8 Claims. (Cl. 188—152)

My invention has for its object a simple and sturdy arrangement for obtaining the permanent control and adjustment of the jaws of hydraulically controlled brakes.

The idle strokes that detrimentally affect the efficiency of braking mechanisms are due to the always increasing wear of the linings. Heretofore, this wear was compensated by a device designed for this purpose and that required frequent adjustments. The present invention avoids such adjustments and provides an efficient arrangement including no catch, no screw-threaded member, no ball and no distributing slide valve.

Furthermore, my invention has for its object to provide for the control of the jaws to an adjusted extent each time the control pedal is depressed. This may be obtained in accordance with my invention by means of a brake-controlling piston that is controlled hydraulically through the agency of a member slidingly engaging the piston and urging it forwards with a liquid body between the piston and said member, the volume of which is proportional to the wear of the brake shoes and is constituted by a mass of liquid sucked in between said piston and said member to compensate for the lost motion produced by increasing wear, the suction being executed through a complementary movement of the piston operated alone by the hydraulic pressure.

I have illustrated in accompanying drawings two preferred embodiments of my invention. In said drawings:

Fig. 1 illustrates the cylinder of the self-adjusting brake in association with the brake jaws.

Fig. 2 is a longitudinal section of the cylinder arrangement when inoperative, with the assumption that the jaws are equipped with new brake linings.

Fig. 3 is a longitudinal cross-sectional view of the same arrangement after compensation of the wear of the linings.

Fig. 4 is a cross-section of the bottom of the cylinder of the same arrangement through line IV—IV of Fig. 2.

Fig. 5 is an end view of the auxiliary piston forming part of the arrangement.

Fig. 6 is a diagrammatic showing of a modified cylinder and brake arrangement.

Fig. 7 is a longitudinal cross-section of the same arrangement and

Fig. 8 illustrates by way of example an embodiment of the wear-compensating valve incorporated in the modified arrangement.

Turning to Figs. 1 to 3, the members constituting my arrangement are shown as follows:

1 designates the carrier body incorporating the seats for the auxiliary pistons, 2 designates the cylinders located to either side of said body and forming abutments for the auxiliary pistons, 3 designates the main pistons slidingly carried in the cylinders 2 and provided with longitudinal bores forming guides for said auxiliary pistons 4 provided at their outer ends with stops 5. The drain plugs are shown at 6 and close channels communicating with the outer ends of the bores containing the auxiliary pistons.

The main pistons are held at the ends of their outer strokes against the stops 7 and they are provided on their inner surfaces with fluid-tight rings 8 engaging the corresponding cylinders. Fluid-tight packings are provided at 9 between the body 1 and the cylinders 2. The input of liquid into the body 1 is shown at 10 beyond which input the liquid is adapted to act on the inner ends of the auxiliary pistons.

The brake jaws 12 submitted to the action of the springs 11 urging them away from the brake drum 13 are controlled positively by the main pistons 3.

When positioned as shown in Fig. 1, the wheel-braking cylinder is emptied of the air contained therein through an opening of the draining plugs 6 before operation. Through its very execution, the arrangement provides an idle stroke during which no compensation of play can be performed, so as to avoid any locking of the drum brake as a consequence of an expansion under the action of heat. This idle stroke is limited by the engagement of the abutments 5 of the auxiliary pistons against the bottom surfaces of the cylinders 2.

This emptying of the air inside the arrangement is associated with the filling by means of a liquid that remains inoperative between the auxiliary pistons 4 that rest against their seats provided on the carrier body 1 as illustrated in Fig. 2 and the main pistons 3, the outer ends of which are submitted to the pressure due to the return spring 11 acting on the brake jaws.

At the beginning of a braking operation, the liquid is brought under pressure into a pipe leading to the input end 10 of the body 1. When the pressure is sufficient and overcomes the action of the return spring 11, the auxiliary pistons are raised away from their seat at 1 and the main pistons 3 are urged outwardly by said auxiliary pistons against the intervening mass of liquid at K between the pistons and they exert an effort on the brake jaws 12. The translational movement thus exerted by the pistons 3 is ensured through the fact that the liquid is practically incompressible and transmits entirely the pressure communicated thereto.

The contact between the jaws and the brake drum is obtained by an increase in the volume of liquid that is transmitted into the wear-compensating chambers K at the outer end of the auxiliary pistons, said increased volume being transmitted through the connecting channels 14 formed in the main piston 3.

When the brake linings are new, they come into contact with the drum periphery at the very moment at which the stops 5 on the auxiliary pistons 4 abut against the bottom of the cylinders 2 where their movement is stopped.

The path followed by the auxiliary pistons 4 between their position engaging their seats on the body 1 up to the engagement of the stop 5 with the cylinder 2 corresponds to their idle stroke. Under such conditions, corresponding to new linings, the braking is performed immediately upon engagement of the stops considered.

It should be remarked that the stop 5 is discontinuous as shown in Fig. 5 and that passages are left between its elements to allow the flow of liquid at all times through said stop the elements of which bear on an annular flange 5' provided on the underside of the bottom of the cylinder 2 as shown in Fig. 4. 1' designates in said latter figure the elongated port inside which the auxiliary piston passes with a clearance.

When the braking is at an end, the pressure in the feeding pipe as also in the braking device, is released and drops underneath the pressure exerted by the spring which thus returns the brake jaws 12 into their inoperative position. The jaws urge energetically back the ends of the main pistons that drive the liquid inwardly through the seats in the body 1. During this return stroke, the main pistons 3 carry along with them the auxiliary pistons which meet no resistance. When said auxiliary pistons have returned onto their inner seats, the pressure of the spring continues being exerted but as the liquid is incompressible, the latter remains enclosed as a solid mass in the chamber K between the main and auxiliary pistons, said mass extending into the channel 14 and the space between each main piston and the body 1.

If the linings are worn, the clearance separating them from the brake drum is equal to the original clearance between the linings when new and the brake drum plus the difference in size between the new and the worn lining.

The operation is similar to that described precedingly until the stops on the auxiliary piston come into contact with the bottom of the cylinders 2 which limits the stroke of said auxiliary pistons. At this moment, there is no braking exerted by reason of the clearance existing between the drum and the brake lining, which clearance is equal to the wear of the linings. The pressure continuing its action urges the main piston 3 forward by a length corresponding to said wear of the lining. During this latter complementary travel the auxiliary pistons 4 are held stationary by the bottom surface of the cylinders, which does not prevent them from assuming a sliding movement with reference to the main pistons that continue their progression. There is exerted thus in the wear-compensating chamber K a certain suction on the liquid through the agency of the channels 14 formed in the main pistons. This leads to an increase in the volume of liquid available in said chamber.

When the braking is at an end, the pressure feeding the liquid through the admission pipe at 10 is less than that of the spring and the liquid is returned in the same manner as in the preceding operation but, as the volume of liquid in the wear compensating chamber has increased, the consequence is that the main and auxiliary pistons execute a return stroke that is no longer equal to the entire forward stroke but is equal only to the idle stroke. Consequently, the wear is compensated automatically through an increase of the liquid volume enclosed between the two pistons.

Turning now to Figs. 6 to 8, the same reference numbers relate to the same parts as in the case of Figs. 1 to 5. The modification disclosed includes as precedingly a main body forming the seat of the auxiliary pistons 4 and cylinders 2 forming abutments for the stops 5 on the auxiliary pistons and containing the main pistons 3. The draining plugs are again shown at 6, the outer stops for the main cylinders at 7, the fluid-tight rings at 8, the fluid-tight packing at 9, the input of liquid at 10. In addition thereto, a stop for the fluid-tight ring 8 is provided at 16. As in the preceding case, the brake jaws 12 are interconnected through a return spring 11. The modification consists chiefly in providing the channel 14 through the auxiliary piston 4 and in closing said channel through a nonreturn valve 15 constituted for instance by a spring urged valve (Fig. 8).

The wheel-braking cylinder is emptied of the air it contained before operation through the draining at 6.

The design of the arrangement is such that an idle stroke is allowed during which no clearance compensation may be obtained whereby the locking of the brake drum through thermic expansion is avoided. Said idle stroke is limited by the engagement of the auxiliary pistons with the cylinders 2.

As precedingly, at the beginning of a braking operation, the pressure of the liquid increases at the input end 10 and when it is high enough for it to overcome the pressure of the return spring 12, the auxiliary pistons 4 are raised above their seat 1. During their stroke, the latter carry along with them the main pistons 3 that control the brake jaws 12.

The stroke is a limited one and corresponds to the above mentioned predetermined idle stroke. When the linings are new, the braking is obtained immediately as explained hereinabove.

When the braking is at an end, the spring returns the jaws into their inoperative position for which they urge the main pistons 3 back into their starting position so that the main auxiliary pistons return bodily into their original positions.

As the reaction of the drum on the brake linings is not uniform, the latter do not wear regularly, but their shape and curvature remain in theory identical to that of the drum. Considering any point on a worn lining, said point has to execute during the braking, in addition to the normal stroke or idle stroke, the difference arising through wear, that is the difference in size between the new and the worn lining.

The operation with a worn lining is the same as with a new lining up to the moment at which the abutments on the auxiliary pistons come into contact with the cylinders defining their stroke. The pressure continuing its action on the main pistons urges the latter forward by a length corresponding to the wear of the lining. The liquid that originally occupied a predetermined volume, occupies now a greater volume after it has been forced through the wear-compensating valve 15 into the inner chamber K between the auxiliary piston and the main piston.

The braking being at an end, the main pistons are submitted to the action of the brake spring 11 through the agency of the jaws that return them into their inoperative position, their movement being transmitted to the auxiliary pistons so as to return the liquid through the closing seats while travelling backwards over their idle stroke. When the auxiliary pistons have returned onto their seats, they close the input of liquid that is thus imprisoned between the auxiliary and main pistons. During this return movement, the valve 15 prevents any escape of liquid out of the chamber K so that the volume of liquid therein remains perfectly invariable during the return stroke considered. This compensates automatically the wear of the lining through an increase in the volume of liquid thus enclosed at K so that any subsequent braking is obtained through mere engagement of the auxiliary pistons with the cylinder and a further relative movement between the auxiliary and main pistons is required only upon further wear of the linings.

Obviously and without unduly widening the scope of my invention, many modifications may be brought to the embodiment disclosed. In particular, the braking means may be duplicated on each wheel. Also, instead of using a double arrangement of cylinders and pistons as illustrated, it is obvious that a single set of pistons 3—4 may be used in association with the carrier body 1.

In addition to the advantage of the automatic compensation of the increasing wear in hydraulically controlled brakes, it should be remarked that my invention allows the same efficiency of braking to be obtained on all the braked wheels of the vehicle with an equal efficiency for all, whatever may be the actual wear of each individual lining.

What I claim is:

1. In a hydraulically controlled brake for vehicle wheels including a brake drum, a brake jaw cooperating therewith and a spring urging the same away from the drum, the combination of a cylinder including two covers provided each with a central perforation, a main piston adapted to reciprocate fluidtightly in said cylinder, including an axial projection passing fluid-tightly through the perforation in one cover and adapted to urge the brake jaw against the brake drum in antagonism with the action of its spring, said main piston being provided with a blind axial bore facing the second cover and with a channel connecting the inner end of said bore with a point of the surface of the main piston facing the second cover, an auxiliary piston adapted to reciprocate fluidtightly inside the bore of the first piston and including an extension adapted to reciprocate with a clearance in the perforation in the second cover and an abutment at the periphery of said extension adapted to engage, in its innermost position with reference to the main piston, the outside of the second cover, means for feeding temporarily a braking fluid under pressure through the perforation in the second cover into the chamber defined between the main piston and the second cylinder cover and thence through the channel in the main piston into the chamber defined in said bore between the auxiliary and main pistons until the main piston has urged the brake jaw into contact with the brake-drum and means cooperating with the auxiliary piston for closing the admission of braking fluid into the first chamber considered when the fluid feeding means are inoperative and the spring has urged the brake jaw and pistons back into their inoperative position.

2. In a hydraulically controlled brake for vehicle wheels including a brake drum, a brake jaw cooperating therewith and a spring urging the same away from the drum, the combination of a cylinder including two covers provided each with a central perforation, a main piston adapted to reciprocate fluid tightly in said cylinder, including an axial projection passing fluid-tightly through the perforation in one cover and adapted to urge the brake jaw against the brake drum in antagonism with the action of its spring, said main piston being provided with a blind axial bore facing the second cover, an auxiliary piston adapted to fluidtightly reciprocate inside the bore of the first piston and including an extension adapted to reciprocate with a clearance in the perforation in the second cover and an abutment at the periphery of said extension adapted to engage, in its innermost position with reference to the main piston, a portion of the wall of the perforation on the outside of the second cover, means connecting the chamber defined between the inner end of said piston and the bottom of the bore in the main piston with the chamber defined between the second cylinder cover and the surface of the main piston facing same, means for feeding a braking fluid under pressure through the perforation in the second cover into the chamber defined between the main piston and the second cylinder cover and thence through the lastmentioned connecting means into the chamber defined between the auxiliary and main pistons and means associated with the auxiliary piston for closing the admission of braking fluid into the first chamber considered when the pressure of the spring acting on the brake jaw predominates over the fluid pressure in the chamber between the main piston and the second cylinder cover and urges the pistons back into their inoperative position.

3. In a hydraulically controlled brake for vehicle wheels including a brake drum, a brake jaw cooperating therewith and a spring urging the same away from the drum, the combination of a cylinder including two covers provided each with a central perforation, a main piston adapted to reciprocate fluidtightly in said cylinder, including an axial projection passing fluidtightly through the perforation in one cover and adapted to urge the brake jaw against the brake drum in antagonism with the action of its spring, said main piston being provided with a blind axial bore facing the second cover, an auxiliary piston adapted to reciprocate fluidtightly inside the bore of the first piston and including an extension adapted to reciprocate with a clearance in the perforation in the second cover and an abutment at the periphery of said extension adapted to engage, in its innermost position with reference to the main piston, a portion of the wall of the perforation on the outside of the second cover, said auxiliary piston being provided with a channel connecting its inner end with a point of the surface of said auxiliary piston registering with the chamber defined by the second cover and the corresponding surface of the main piston, a valve closing said channel, a spring urging said valve into its closing position against the pressure exerted by the liquid in the above mentioned chamber when said pressure drops underneath a predetermined value, means for feeding a braking liquid through the perforation in the second cover into the chamber defined between the main piston and the second cylinder cover and thence through the bore in the auxiliary piston into the chamber defined between the auxiliary and main pistons, and a stop on the auxiliary piston adapted to close the liquid-feeding means when said auxiliary piston is returned into its inoperative position through action of the spring on the brake jaw and consequently on the system including the pistons and the mass of liquid in the chamber formed by the part of the bore between the two pistons.

4. In a brake system operated hydraulically, the combination of a wheel, a brake drum carried by said wheel, at least one pair of jaws pivotally secured to said drum and adapted to engage frictionally the inner periphery thereof, a spring connecting said jaws and urging them into their inoperative positions, a carrier provided with a channel system adapted to receive the hydraulic fluid and with recesses on its opposite sides, into which recesses corresponding fluid-delivering channels of the channel system open, a cylinder carried by said carrier coaxially with each recess and facing the free end of the corresponding jaw, a main piston adapted to reciprocate fluidtightly in each cylinder and adapted to control the corresponding jaw in antagonism with the spring acting thereon, each main cylinder being provided with a bore coaxial therewith, an auxiliary piston adapted to reciprocate inside said bore and passing with a slight clearance through the bottom of the cylinder into the corresponding recess in the carrier to seat on the latter in its outermost position, a flange provided on said auxiliary piston on the outside of the cylinder bottom and adapted to abut against the outside of said cylinder bottom for a predetermined position of the auxiliary piston and means for connecting the chamber defined between the bottom of the cylinder and the main piston with the chamber defined between the inner end of the auxiliary piston and the bottom of the bore in which it moves.

5. In a brake system operated hydraulically, the combination of a wheel, a brake drum carried by said wheel, at least one pair of jaws pivotally secured to said drum and adapted to engage frictionally the inner periphery thereof, a spring connecting said jaws and urging them into their inoperative positions, a carrier provided with a channel system adapted to receive the hydraulic fluid and with recesses on its opposite sides, into which recesses corresponding fluid-delivering channels of the channel system open, a cylinder carried by said carrier coaxially with each recess and facing the free end of the corresponding jaw, a main piston adapted to reciprocate fluidtightly in each cylinder and adapted to control the corresponding jaw in antagonism with the spring acting thereon, each main cylinder being provided with a bore coaxial therewith, an auxiliary piston adapted to reciprocate inside said bore and passing with a slight clearance through the bottom of the cylinder into the corresponding recess in the carrier to seat on the latter in its outermost position, a flange provided on said piston on the outside of the cylinder bottom and adapted to abut against the outside of said cylinder bottom for a predetermined position of the auxiliary piston and means for connecting the chamber defined between the bottom of the cylinder and the main piston with the chamber defined between the inner end of the auxiliary piston and the bottom of the bore in which it moves, means whereby the chamber at the inner end of the auxiliary piston communicates through the main piston with the atmosphere and a plug adapted to close said means.

6. In a brake system operated hydraulically, the combination of a wheel, a brake drum carried by said wheel, at least one pair of jaws pivotally secured to said drum and adapted to engage frictionally the inner periphery thereof, a spring connecting said jaws and urging them into their inoperative positions, a carrier provided with a channel system adapted to receive the hydraulic fluid and with recesses on its opposite sides, into which recesses corresponding fluid-delivering channels of the channel system open, a cylinder carried by said carrier coaxially with each recess and facing the free end of the corresponding jaw, a main piston adapted to reciprocate fluidtightly in each cylinder and adapted to control the corresponding jaw in antagonism with the spring acting thereon, each main cylinder being provided with a bore coaxial therewith, an auxiliary piston adapted to reciprocate inside said bore and passing with a slight clearance through the bottom of the cylinder into the corresponding recess in the carrier to seat on the latter in its outermost position, a flange provided on said piston on the outside of the cylinder bottom and adapted to abut against the outside of said cylinder bottom for a predetermined position of the auxiliary piston, said auxiliary piston being provided with a channel connecting its inner end with a point of the surface of said auxiliary piston registering with the chamber defined by the cylinder bottom and the corresponding surface of the main piston, a valve closing said channel, a spring urging said valve into its closing position against the pressure exerted by the liquid in the above mentioned chamber when said pressure drops underneath a predetermined value.

7. A brake arrangement for vehicles comprising a brake drum, at least two brake jaws cooperating therewith, a cylinder associated with each brake jaw and the head of which is provided with a perforation, a main piston slidably carried in said cylinder and controlling the corresponding brake jaw and provided with an axial bore, an auxiliary piston adapted to slide inside said piston bore and extending through the perforation in the cylinder head with a clearance, said main piston and auxiliary piston defining with each other at the inner end of the bore a closed chamber of varying volume adapted to be filled with a body of liquid, communicating means connecting said closed chamber with the chamber defined between the main piston and the cylinder, hydraulic controlling means acting simultaneously on the different systems of associated main and auxiliary pistons for urging each system bodily forward with the body of liquid contained in the chamber between them and means whereby the clearance produced by increasing wear between the brake drum and one of the brake jaws urged towards said drum by said hydraulically controlled movement of the associated main and auxiliary pistons produces a relative complementary movement of the main piston with reference to the auxiliary piston and thereby a complementary suction of liquid into the closed chamber between said main and auxiliary pistons associated with the worn brake jaw.

8. A brake arrangement for vehicles comprising a brake drum, at least two brake jaws cooperating therewith, a cylinder associated with each brake and the head of which is provided with a perforation, a main piston slidably carried in said cylinder, controlling the corresponding brake jaw and provided with an axial bore, an auxiliary piston adapted to slide inside said piston bore and extending through the perforation in the cylinder head with a clearance with reference to the latter, a stop rigid with the auxiliary piston on the outside of the cylinder and adapted to abut against the latter for a predetermined position of said auxiliary piston during its inward movement with reference to the main piston, said main piston and auxiliary piston defining with each other at the inner end of the bore, a closed chamber of varying volume adapted to be filled with a body of liquid, means connecting said closed chamber with the chamber defined between the main piston and the cylinder, hydraulic controlling means acting simultaneously on the different systems of associated main and auxiliary pistons for urging each system bodily forward with the body of liquid contained in the chamber between them, the relative movement of each main piston with reference to the associated auxiliary piston produced by the hydraulic controlling means, when said auxiliary piston is arrested by abutment of its stop against the cylinder, increasing the volume of the closed chamber to provide a complementary filling thereof with liquid from the chamber defined between the main piston and the cylinder, and non-return valve means controlling the means connecting the closed chamber with last mentioned chamber.

ROBERT ADOLPHE PAUL MOUGIN.

References Cited in the file of this patent

UNITED STATES PATENTS

| Number | Name | Date |
|---|---|---|
| 1,569,143 | Robinson | Jan. 12, 1926 |
| 2,533,902 | Sime | Dec. 12, 1950 |